United States Patent
Lee et al.

(10) Patent No.: US 6,609,150 B2
(45) Date of Patent: *Aug. 19, 2003

(54) WEB CLIENT-SERVER SYSTEM AND METHOD FOR INCOMPATIBLE PAGE MARKUP AND PRESENTATION LANGUAGES

(75) Inventors: King-Hwa Lee, Newcastle, WA (US); Robert Cram, San Francisco, CA (US); Anil Mukundan, San Jose, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/024,524

(22) Filed: Dec. 21, 2001

(65) Prior Publication Data

US 2002/0120719 A1 Aug. 29, 2002

Related U.S. Application Data

(63) Continuation of application No. 09/540,772, filed on Mar. 31, 2000, now Pat. No. 6,336,137.

(51) Int. Cl.[7] .............................................. G06F 13/00
(52) U.S. Cl. ........................ 709/219; 709/230; 709/329
(58) Field of Search ................................. 709/217, 219, 709/313, 328, 329, 230

(56) References Cited

U.S. PATENT DOCUMENTS

| | | | |
|---|---|---|---|
| 5,701,451 A | 12/1997 | Rogers et al. | |
| 5,787,437 A | 7/1998 | Potterveld et al. | |
| 5,857,197 A | 1/1999 | Mullins | |
| 5,872,915 A | 2/1999 | Dykes et al. | |
| 6,012,098 A | 1/2000 | Bayeh et al. | |
| 6,167,441 A | 12/2000 | Himmel | |
| 6,243,711 B1 * | 6/2001 | Wu et al. | 707/104 |

* cited by examiner

Primary Examiner—Viet D. Vu
(74) Attorney, Agent, or Firm—James W. Soong; Perkins Coie LLP

(57) ABSTRACT

Client-server systems and methods for transferring data via a network, including a wireless network, between a server and one or more clients or browsers that are spatially distributed (i.e., situated at different locations). At least one local client computer provides a user interface to interact with at least one remote server computer which implements data processing in response to the local client computer. The user interface may be a browser or a thin client.

59 Claims, 4 Drawing Sheets

("PRIOR ART")

("PRIOR ART")

```
HTTP://www.mysite.com/myapp/start.swe?SWEview="myLoginControlView"&SWE
applet="myLoginControlApplet"&SWEcmd=InvokeMethod&SWEmethodName="autol
ogin"&Myargs0="abc"&Myargs1="def"
```

```
HTTP://www.mysite.com1/myapp2/start.swe?3/SWEview="myLoginControl
View"4/&SWEapplet="myLoginControlApplet"5/&SWEcmd=InvokeMethod6/&S
WEmethodName="autologin"7/&Myargs0="abc"8/&Myargs1="def"9/
```

| fn | COMMAND | ACTION |
|---|---|---|
| 1 | www.mysite.com | Go to server "www.mysite.com" |
| 2 | myapp | Go to directory "myapp" on the server |
| 3 | start.swe? | Start the "swe" applications |
| 4 | SWEview="myLoginControlView" | retrieve depository object "myLoginControlView" |
| 5 | SWEapplet="myLoginControlApplet" | retrieve depository object "myLoginControlApplet" |
| 6 | SWEcmd="InvokeMethod" | Execute "invokeMethod" |
| 7 | SWEmethodName="autologin" | Execute "autologin" |
| 8 | Myargs0="abc" | Use arguments "abc" |
| 9 | Myargs1="def" | Use arguments "def" |

FIGURE 5

WEB CLIENT-SERVER SYSTEM AND METHOD FOR INCOMPATIBLE PAGE MARKUP AND PRESENTATION LANGUAGES

CROSS-REFERENCE TO RELATED APPLICATION

This application is a continuation of application Ser. No. 09/540,772, filed Mar. 31, 2000, now U.S. Pat. No. 6,336,137, the entire content of which is hereby incorporated by reference.

FIELD OF THE INVENTION

The invention relates to client-server systems and methods for transferring data via a network between a server and one or more clients that are spatially distributed (i.e., situated at different locations), and where at least one local client computer provides a user interface to interact with at least one remote server computer which implements data processing in response to the local client computer.

BACKGROUND

The Internet World Wide Web (WWW) architecture provides a very flexible, powerful, and potentially extensible programming model. As shown in FIG. 1, denominated "Prior Art", applications and content are presented in standard data formats, and are browsed by applications known as web browsers. The web browser, 11, is a thin client, networked application, i.e., it sends requests, 21, for named data objects to a web or network server, 13, and the web or network server, 13, responds with the data encoded, 31, using the standard formats.

The WWW standards specify many of the mechanisms necessary to build a general-purpose application environment, including:

1. Standard naming model—All servers and content on the WWW are named with an Internet-standard Uniform Resource Locator (URL).
2. Content typing—All content on the WWW is given a specific type thereby allowing web browsers to correctly process the content based on its type.
3. Standard content formats—Heretofore; all web browsers have supported a set of standard content formats. These include the HyperText Markup Language (HTML), the JavaScript scripting language, and a large number of other formats.
4. Standard Protocols—Standard networking protocols allow any web browser to communicate with any web server. The most commonly used protocol on the WWW is the HyperText Transport Protocol (HTTP).

This infrastructure allows users to easily reach a large number of third-party applications and content services. It also allows application developers to easily create applications and content services for a large community of clients. However, the success of the WWW and the underlying ATM and TCP/IP protocols has spurred new applications and rapid growth, limited only by the constraints of the underlying programming tools and page delivery languages. This has required optimizations, extensions, and "work arounds." This is especially so in the wireless or handheld environment.

The wireless or handheld environment presents challenges. The devices are physically small; they have low processor power, low memory capacity, small displays, narrow bandwidths, frequently with embedded communications software, and frequently with touch pads in addition to or instead of keypads. The Wireless Application Protocol ("WAP") has been developed for these portable devices.

The Wireless Application Protocol ("WAP") programming model is similar to the WWW programming model. Optimizations and extensions have been made in order to match the characteristics of the wireless environment. WAP content and applications are specified in a set of well-known content formats based on the familiar WWW content formats. Content is transported using a set of standard communication protocols based on the WWW communication protocols. A micro browser in the wireless terminal co-ordinates the user interface and is analogous to a standard web browser.

The WAP protocol defines a set of standard components that enable communication between mobile terminals and network servers, including:

1. Standard naming model—WWW-standard URLs is used to identify WAP content on origin servers. WWW-standard URLs are used to identify local resources in a device, e.g. call control functions.
2. Content typing—All WAP content is given a specific type consistent with WWW typing. This allows WAP user agents to correctly process the content based on its type.
3. Standard content formats—WAP content formats are based on WWW technology and include display markup, calendar information, electronic business card objects, images and scripting language.
4. Standard communication protocols—WAP communication protocols enable the communication of browser requests from the mobile terminal to the network web server.

An example WAP-compliant network is shown in FIG. 2, denominated "Prior Art." In the example, the WAP client, 12, communicates with a web server, 14, through a WAP gateway, 15. The WAP gateway, 15, translates WAP requests, 22, to WWW requests, 23, thereby allowing the WAP client, 12, to submit requests, 22, to the web server, 14. The gateway, 15, also encodes the responses, 33, from the web server, 14, into the compact binary format, 32, understood by the client, 12.

If the web server, 14, provides WAP content (e.g., WML), the WAP gateway, 15, retrieves it directly from the web server, 14. However, if the web server, 14, provides WWW content (such as HTML), a filter is used to translate the WWW content, 33, into WAP content, 32. For example, the HTML filter would translate HTML into WML.

The Wireless Telephony Application (WTA) server is an example origin or gateway server that responds to requests from the WAP client directly. The WTA server is used to provide WAP access to features of the wireless network provider's telecommunications infrastructure.

The WAP architecture provides a scaleable and extensible environment for application development for mobile communication devices. This is achieved through a layered design of the entire protocol stack where each of the layers of the architecture is accessible by the layers above, as well as by other services and applications. The WAP layered architecture enables other services and applications to utilize the features of the WAP stack through a set of well-defined interfaces. External applications may access the session, transaction, security and transport layers directly.

WAP browsers understand the wireless mark-up language or WML as specified by the Wireless Application Protocol. WML is used to create the user interface that is rendered on the browser. WML is an extension of the extensible mark-up language or XML (the successor to HTML) and was developed specifically for wireless devices.

The views generated by the web engine travel through a web server and a WAP gateway server to reach the wireless network and the browser enabled wireless device. The WAP gateway server translates the data from the Internet protocol (HTTP) to the WAP protocol and binary encrypts (through the Wireless Secure Transaction Layer specification) and compresses the data. The screens are generated on demand when a user requests the information from their wireless device.

An end user accesses the server over the wireless network by entering a URL into the WAP browser. In addition, the wireless handset must be configured to dial into a modem bank and a remote access server (RAS) inside the enterprise's firewall. From the RAS, the user connects over a LAN to the WAP Gateway Server and then to the web server. The protocol is again HTTP inside the firewall and security is not a perceived issue since the transfer from the WAP protocol to the Internet protocol occurs inside the firewall.

Alternatively, the end user may access the WAP server at a mobile carrier, and the mobile server/WAP server communicate in HTTP over an internet, an intranet, or a LAN, with a Web Server.

The WAP standard specifies two essential elements of wireless communication: an end-to-end application protocol and an application environment based on a browser. The application protocol is a layered communication protocol that is embedded in each WAP-enabled user agent. The network side includes a server component implementing the other end of the protocol that is capable of communicating with any WAP device. Often the server component takes the role of a gateway routing the requests from the user agent to an application server. The gateway can be physically located in a telecom network or a computer network, building a bridge between the wireless network and the computer network.

The WAP application consists of a server application and a client application that the gateway downloads from the application server to the device (user agent) for execution. WAP provides a standard application environment consisting of a browser and a script interpreter. The browser is similar to a web browser and handles content described in WML (or HDML—Handheld Device Markup Language) and a JavaScript-like scripting language called WMLScript. WML and WMLScript are designed for use in wireless, narrowband networks, and they are both binary encoded for optimum transmission efficiency.

In WAP, the content and the applications are addresses with a URL. The WAP operates as follows under the WAP Protocol:

1. The user enters a URL, as by pressing a phone key that has a URL request assigned to it.
2. A user agent in the device sends a URL request to a WAP gateway using the WAP protocol.
3. The WAP gateway creates a conventional HTTP request for the specified URL and sends it to the web server.
4. The web server processes the HTTP request. To process the request he web server runs a backend application or fetches some WML files and adds HTTP headers to them.
5. The web server returns the WML file or the WML output from the application server with the added HTTP header. A WML file is also called a WML deck. A WML deck consists of one or more "screens" called cards.
6. The WAP gateway verifies the HTTP header and the WML content and encodes them to binary form. The gateway then creates a WAP response containing the WML and sends it to the user agent.
7. The user agent receives the WAP response. It processes the WML response and displays the first card of the WML deck to the user.

Steps 4 and 5, above, are specified functionally and generally, without providing on how the "server" is to go from WML to HTTP, process in HTTP, recover WML "decks" and content, and send the decks and content to the WAP gateway without loss of information.

Moreover, the Wireless Application Protocol and the Wireless Markup Language is merely exemplary of a class of new browsers, browser protocols, and page delivery and markup languages that are not fully compatible with HTML and XML but that co-exist with HTML/XML servers. The set of these browsers, browser protocols, and page delivery and markup languages will only grow over time, and a clear need exists for providing compatibility and interoperability between them and existing web servers and application servers.

SUMMARY

The invention relates to client-server methods and systems where various clients that use different markup languages may use the same server, which can serve pages in various languages. The client may be a thin client or browser, as that term is generally understood. The server is configured to parse the request from the client to determine both the language of the request and the information requested. In the current implementation, through various configuration methods, the HTTP server associates a markup language with each virtual directory. Clients that want to request a particular markup language route their requests to the appropriate directory. The system directs requests in those virtual directories to components that serve the correct markup language. This may be done dynamically. The server, who may include a web server, additional web server software, a web engine, and associated metadata repositories and tools, recovers information including browser-compatible views, applets, and templates from the metadata repository associated with the server. The server uses the browser compatible views, applets, and templates to render a page to the client including data, information and views in the language of the request. The rendered views are displayed in a language supported by the client or browser.

In the method and system of the invention browser or client request for pages includes tokens, which may be of the form "start.swe" followed by one or more commands of the type "SWEapplet" or "SWEview" to specify the actions, and objects requested. The server obtains objects referred to by the tokens, by taking templates from the repository, inserting code, and sending the tokens the server and gateway to the browser or client. The tokens specifying the language of the request are embedded in the request from the client or browser, as in HTTP://www.mysite.com/myapp/start.swe?SWEview= ".."&SWEapplet=".."&SWEc md=".."&SWEmethodName=".."

where the tokens include start.swe, SWEview, SWEapplet, SWEcmd, and SWEmethodName. No technical importance should be attached to the specific names, which are arbitrary, and that look like "SWExxx", or that they are specifically "View", "Method Name", etc., or that "start.swe" matters. The expression illustrates that the URL is a script of business or application terms, including business objects, UI objects, name commands to be processed by them, and an implicit command to reply with an HTTP response that renders their resulting states. These items are modeled in a metadata repository that is not dependent on markup language. The Web Engine renders these markup language-independent metadata objects in the markup language of choice. That's the essence of the invention. Some requests include additional information in the request body, which is not visible in the URL.

In a preferred embodiment of our invention the client is a wireless client configured to send requests incorporating tokened requests for pages to the server and receive pages from the server, where tokened requests specify the language of the request and of the requested response, as WML, and where the server is configured to parse the tokened request from the client to determine the language of the request and the information requested; that is, WML, and recover information including views from a repository associated with the server; and to thereafter render a page to the client including information and views in the language of the request, as WML, and the view is a display with applets in the language requested by the client, as WML decks.

While the method and system of the invention have been described, illustrated, and summarized with respect to a class of wireless devices utilizing the Wireless Application Protocol (WAP) and the Wireless Markup Language (WML), it is, of course intended that the method and system of the invention may be employed in other browser or client configurations, formats, and form factors utilizing the WAP with WML, as well as in other clients and browsers with bandwidths, processor speeds and capacities, memory capacity, and/or input/out capacity markedly different from those characteristics of PC based browsers and clients. A particular aspect of the method and system of the invention is that it is intended to work with browsers or clients that use other markup languages., and is not to be limited to WAP or WML.

According to our invention a client-server method and system is provided where the server is configured to receive requests from the client. send responses to the client. The server is further configured to interpret the request to determine at least one of the language, protocol, or syntax in which the client sends requests and receives responses, and to also interpret the request to determine data submitted by the client, that should be used to create, modify, delete, or append to business objects or user data in the server system. The system then recovers metadata or descriptive information from a metadata repository associated with the server; and creates a response in the preferred language, protocol, or syntax of the client. This response represents the states of some objects in the server system following the processing of the request, properly represented in the language, protocol or syntax preferred by the client.

The system and method further includes the capability for interpreting the request to determine the classes and instances of business objects and user data to associate with the request, and interpreting the request to determine commands to be executed by the business objects. This is followed by interpreting the request to determine data submitted by the client to do one or more of creating, modifying, deleting, or appending to business objects or data in the server.

This interpreted data is used to recover user data or business data from database servers or application servers associated with the server. In a preferred embodiment the server is further configured to optimize the handling of subsequent requests from the same client, by embedding information in early responses to the client, where that embedded response information will be included in subsequent requests from the same client, and where that embedded request information will be used by the server during the processing of subsequent requests.

The server response is in the form of an object intended for display in a client with a user interface. The object may be a page. Alternatively, the server response may be in the form of machine-readable data.

Typically, the client request includes tokens specifying the language requested, and at least one tokens in the request identifies metadata objects that are available to the server system. These metadata objects are selected from the group consisting of views, pages, applets, controls, and objects having user interface semantics. Alternatively, the objects may be business objects, business components, and objects having non-interface semantics, or they may be metadata objects having non-interface semantics, such as linkages to other objects, containment, and association. Associations, are well known from object oriented programming, and in the context of the method and system described herein, an association has a user interface representation. Alternatively, hypertext may be provided to allow or facilitate access to detailed information through drilldown in the user interface.

The client request further includes tokens that specify instances of object types specified in the metadata repository to be created, modified, or deleted.

Part of the metadata associated with an object is in the form of one or more template objects, which template objects contain rules for representing the object in various languages, protocols, or syntaxes. The template object is typically stored as a file in the server file system, or as a binary object in a database or other on-line storage system. Each template object is associated with a particular language, protocol, or syntax. The server system is configured to identify a client's preferred language, protocol, or syntax, and to use a template object associated with that preferred language, protocol, or syntax, to represent an instance of the parent metadata object to the client, and, if necessary, to iterate and enumerate child or subordinate objects.

Some of the rules for representing the object in various languages, protocols, or syntaxes pertain to containment. Other rules are placeholders for specific properties of the metadata object. Moreover, some of the rules include specifiers of a language, protocol for representation of an instance of the metadata object. Still other rules are constants or literals, to enable the representation of portions of the metadata object without processing by the server system beyond inserting the constants or literals into the body of a response to client requests. The rules have multiple variants, each specifying a different language, protocol, or syntax.

A default value to language, protocol, or syntax. Thus, the server may represent the instance of the metadata object by: (1) searching for a rule that specifies the preferred language, protocol, or syntax of the client, and (2) use that rule, or (3) in the absence of a rule, search for a rule that does not specify a language, protocol, or syntax, and use that rule as if it specified the client's current preference.

In an embodiment of the method and system the server recognizes that the client's preferred language is a markup language. The markup language is selected from the group consisting of SGML, HTML, WML, HDML, and XML. Moreover, as noted above, the server is configured to create responses in multiple markup languages. The server may use similarities among various markup languages, to optimize the creation of responses in the different markup languages, and also in the case where one markup language is derived from another markup language, the server can use common components or procedures that represent metadata objects in the parent language. This is true whether or not there is an actual parent language. For example, the system and method described herein treats two or more markup languages as being derived from an artificially constructed markup language. The server may optimize representations in these languages using a hypothetical or actual parent language, where the parent language is the artificial or previously unknown language. A preferred example of this type of optimization is the rendering of objects in WML and HTML, which may be considered to share an artificial or previously unknown language as their parents.

In finding a parent language, the derivation structure of the languages includes more than one layer of derivation. This is also true in the case where an artificial language occupies a position in the derivation structure between one or more known languages. For example, WML and HTML, though both are derived from, or are variants of, SGML, in order to achieve the optimizations, both may be considered variants of another, artificial language, which is considered to be derived from SGML.

Another aspect of the method and system described herein is that the properties of a metadata object that are identified by placeholders in the templates will frequently have different representations in different languages, protocols, or syntaxes, and the server is configured to represent this object in the language of the client. This requires that the server be configured to identify the client's language, protocol, or syntax, and associate it with the current client request. The server does this by querying the current context for the preferred language, protocol, or syntax, and uses this preference to create a response including representations of objects in the preferred language, protocol, or syntax. More particularly, the server is configured to query the context for the preferred language of representation when representing every object in the system.

Another aspect of the method and system described herein is that object-oriented programming techniques, such as those that are available using C++ or Java, may be effectively used to implement the notion that objects represent themselves, where a metadata class has an associated C++ or Java or other programming class, and where the server represents an instance of a metadata object class by creating an instance of the associated programming class, and calling a function or method for that instance that will represent the instance in the correct language, protocol, or syntax. Thus, where the class structure of objects—both metadata objects and programming objects—is elaborate, in particular, where a class of metadata object, for example "Applet", may have a set of specialized programming classes associated with its instances., it is desirable the various specialized programming classes should be related, either through inheritance or through interface implementations, to a single class or interface that is considered the base programming class or base programming interface for the metadata class.

Where the server represents an object of one of these derived classes, this is accomplished by obtaining the name of the derived programming class from the instantiated metadata object, instantiating an instance of that class, and then calling a function or method of that programming instance that will represent it in the preferred language, protocol, or syntax. Additional object-oriented programming techniques may used to implement the notion that objects that contain other objects, either logically or in some user-interface sense, may represent themselves and their contained objects, including by calling functions or methods on child or contained objects, where those functions or methods correctly represent the child or contained objects. The containment structure may have more than 2 layers. The request context may queried for the preferred language, protocol, or syntax, as when some parent objects are prepared for representation, and those parent objects are responsible for causing their contained objects to be represented in the correct language.

The context may be queried only when some objects are represented, and where those objects are responsible for causing their contained or child objects to be rendered in the correct language, protocol, or syntax., or where parent or containing objects directly represent their own child or contained objects in the correct syntax. When the parent or containing objects call functions or methods on their child objects, these calls contain arguments or other context or have function or method names, and where these various means identify the preferred language, protocol, or syntax for the representation, and the child or contained objects use this context to render in the preferred language, protocol, or syntax.

The preferred representation context may be included in an argument to the function or method, or implied by the specific function or method that is called. If the function or method names are well-known to programmers of the system, for example if the server or parent object desires another object to be rendered in WML, it may call a function for that object called ShowWML, where it is well-known that this function represents the object correctly in WML.

Where the well-known function is virtual, either explicitly as in C++ and similar languages, or implicitly as in Java and similar languages, and where the desired effect is for specialized representation methods—specialized either for metadata classes or for metadata instances as described in claim specialized classes may be used to handle the representation correctly.

To optimize the processing of languages that are related, the task of representing an object is first dispatched to the logic that handles the most derived appropriate language, in an instance of the most-derived appropriate programming class. If an implementation is not available, the task is dispatched to the logic that handles the most-derived appropriate language, in the next-most derived programming class. This process continues until either an implementation is found and executed, or the least-derived programming class is found not to have an implementation for the most-derived representation language. In this case, the task of representing the object is dispatched to the handler for the next-most derived language, in the most-derived programming class. This method will cause the object to be represented in the most-derived available language for that object, by the most-derived programming object that has a representation available in that language.

Where the dispatching method is the use of well-known virtual functions, with one virtual function per representation language, with the base implementation of each representation language simply calling the virtual function for the next-most-derived language, and with implementations in derived classes and derived languages necessary only where the derived representation differs from the parent implementation. However, where programmers and configurators who can not extend or specialize the system using C++, Java, or other similar system programming languages, they may write scripts or other event-driven programs in JavaScript, ECMAScript, Visual Basic, or other scripting languages, to specialize the representation of objects in the system, and where they should expect that these scripts will represent the objects in the preferred language. Where these scripts are associated with particular metadata objects in the metadata repository, and where during the servers creation of the representation of an instance of any of these objects, the script is called, and its arguments, context, and methods may be used in the script to get information about the instance, including the preferred representation language, protocol, or syntax for the object. Where these scripts are stored in the metadata repository, whether that be in database form or some compiled or other binary form. Where these scripts are stored in the template objects, which may be files in some part of the server infrastructure's file system.

The system is configured to identify the preferred language, protocol, or syntax of the client, receiving data from the client, and using the data to add, modify, or delete records in the server database. For example, the preferred language may be associated with encoding of the data, and where the server removes this language-dependent encoding, and stores the data in a language independent format. Thus, the format may be persistently associated with the data.

Tags specifying the language of the request are embedded in the request.

The client may be an HTML browser, and the preferred language for representing objects for this client is HTML. Alternatively, the client may be an HTTP browser or wireless device for which the preferred language for responses from the server system is WML.

In still other situations, the preferred language for the client, to be used to create responses from the server system, is XML. In still other applications, the preferred language for the client, to be used to create responses from the server system, is a language which does not include user interface elements.

In one exemplification, the client is also a gateway server for lower level clients. For example, the client may be an HTTP client and also a gateway server to wireless browser clients. In this exemplification, wireless clients request pages from the client via the WAP protocol, and the gateway server transforms the WAP/WML requests from the wireless or other browsers into HTTP/WML requests which it submits as a client to the server. The gateway server receives HTTP/WML responses created by the server, and transforms them into WAP/WML responses which it returns as a gateway server to the wireless browser clients which initiated the request process.

In this embodiment, the client is an HTTP client and also a server to wireless browser clients, and the wireless clients request pages from the client via the WAP protocol. The wireless clients prefer WML as the language for representation of object states in the server system, and the gateway server acts as a client to the higher level server. The gateway server transforms the WAP/WML requests from the wireless or other browsers into HTTP/WML requests which it submits as a client to the higher level server, and takes the HTTP/WML responses created by this server, and transforms them into WAP/WML responses which it returns as a server to the wireless browsers which initiated the request process.

The server is configured to accept requests from multiple clients, in multiple markup languages and to respond to a client in the markup language used by the client.

In one embodiment the client is a wireless client configured to send requests incorporating tagged requests for pages to the server and receive pages from the server. The tagged requests specify the language of the request and of the requested response, and the server parses the tagged request from the client to determine the language of the request and the information requested; recovers information including views from a repository associated with the server; and renders a page to the client including information and views in the language of the request, wherein said view comprises a display and applets in the language requested by the client.

Typically, the view received by the client will contain data from the server.

The client request specifies a directory on the server system, where the directory is associated with the preferred language, protocol, or syntax for the client.

The server is configured to read data embedded in header responses, for example, where the server is configured to embed information included in one or more of URIs, URLs, or URNs in the server responses, and where the client is configured to use the one or more of URIs, URLs, or URNs to submit further requests to the server.

In one embodiment, the server interprets an early request from a client as a persistent preference for language, protocol, or syntax, and stores this preference, using the stored preference to retrieve the language, protocol, or syntax preference of the client from the dictionary or other cache.

For example, the server may create a state description or session for the client during an early request from the client, and thereafter associate a particular language, protocol, or syntax with the session, and maintain the session in expectation of receiving later requests from the client. The embedded information identifies the session, thereby identifying the client's preferred language, protocol, or syntax.

As described above the server may be a multi-tiered server system, comprising multiple programs and where the various are distributed among the different tiers of the system.

BRIEF DESCRIPTION OF DRAWINGS

The attached FIGURES illustrate the Prior Art and two embodiments of the method and system of the present invention.

FIG. 5 illustrates a parsing of a URL request received from a handheld device using the method and system of our invention.

DESCRIPTION OF PREFERRED EMBODIMENTS

The invention relates to client-server systems, especially thin client systems, where the client and the server use multiple markup languages and protocols from the same server. This is illustrated in a client-server system where the thin client is a WAP-compatible, WML-compatible thin client, and the server is an HTML or XML compatible server. The server is not an HTML server per se, but rather an HTTP server that will serve HTML or WML or other markup language.

Communication is effectuated by the thin client including tokens in its URL requests to the server, and the server recognizing these tokens and using them to draw upon a repository of templates, applets, views, and business objects configured for the specific language or protocol utilized by the client.

All uses of the word "tag" up to this point I would replace with the word "token". Tag has a specific meaning in HTML, XML, WML, and other markup languages. We'll be using that meaning later in this document. That meaning differs from the use of the word "tag" to this point in the document.

DETAILED DESCRIPTION

Figure 1:
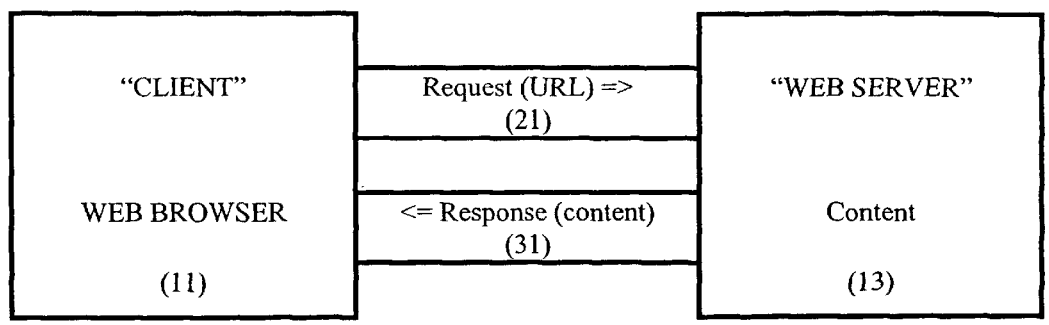
FIG. 1, denominated "Prior Art", illustrates the high level architecture of the Web Browser—Web Server environment.
Figure 2:
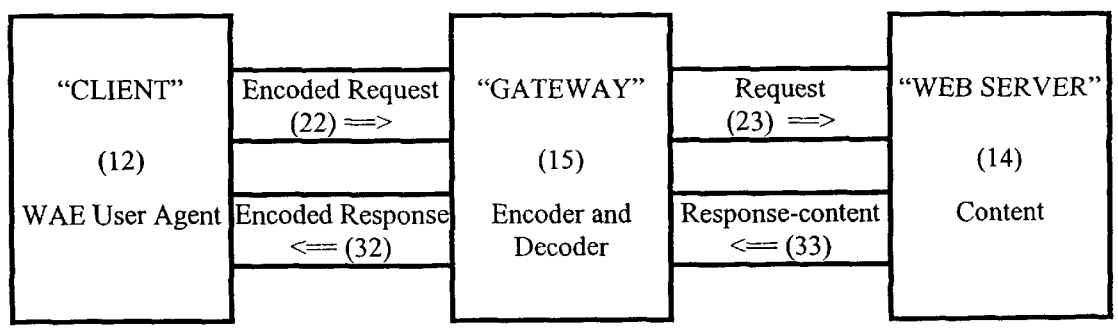
FIG. 2, also denominated "Prior Art", illustrates the high level architecture of the Wireless Application Protocol environment.
Figure 3:
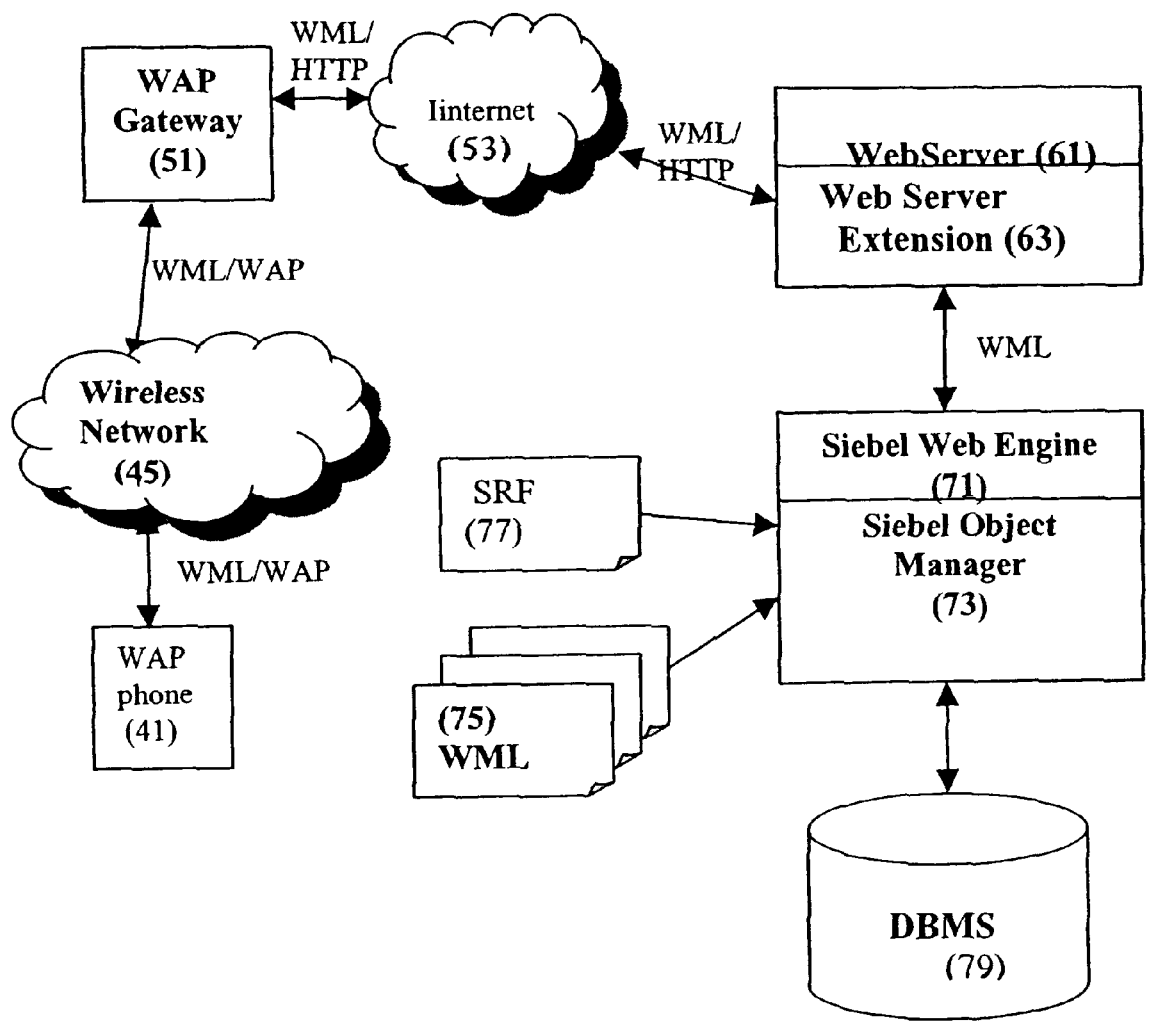
FIG. 3 illustrates the architecture of the Wireless Application Protocol-compatible, Wireless Markup Language-compatible method and system of our invention.
Figure 4:
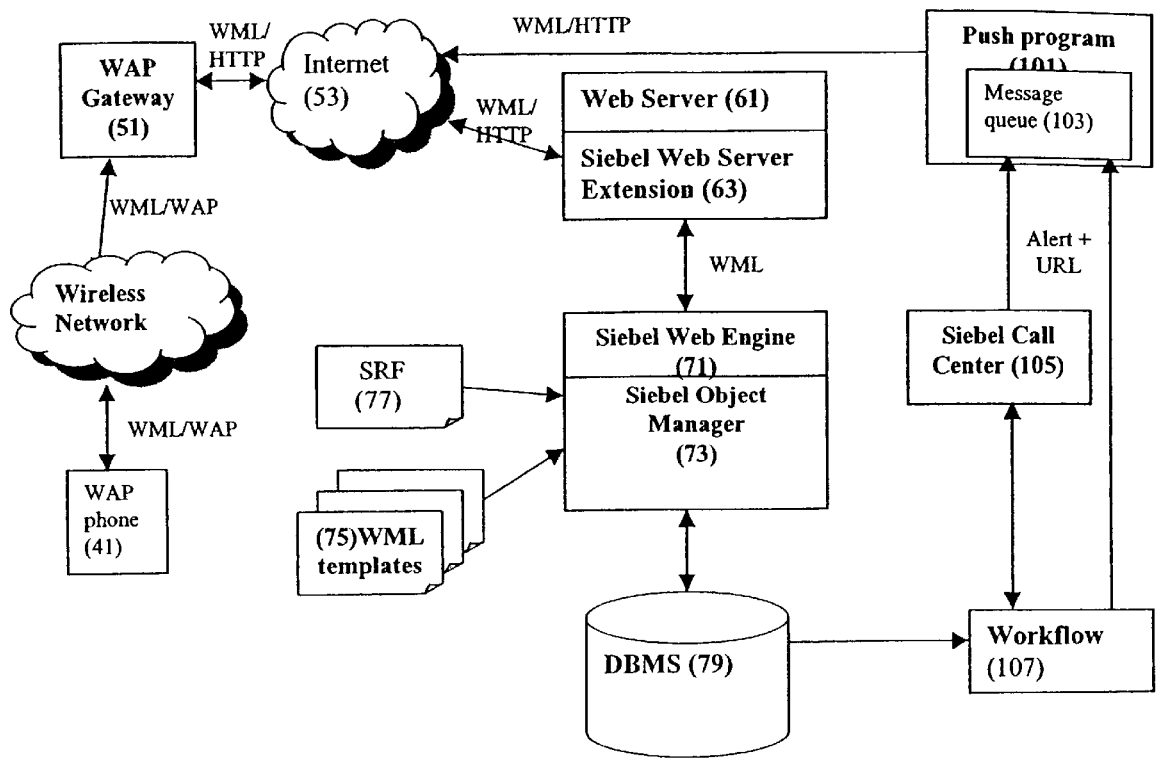
FIG. 4 illustrates the augmented architecture of the Wireless Application Protocol-compatible, Wireless Markup Language-compatible method and system of our invention to utilize push technology.

This invention relates to Web-based client-server systems as shown in FIG. 3 (without separate push capabilities) and FIG. 4 (with separate push capabilities), and especially to thin client-server systems where the server, 61, must interact with a plurality of thin clients, 41, using different page delivery or mark-up languages, providing a degree of interoperability between the disparate clients, 41, and the server, 61. One such implementation is servicing a WAP-compliant thin client, 41, using WML from an HTTP server, 61, connected to one or more application servers. Similar to the HTML thin client, the WAP/WML thin client, 41, does not store data on the client. All application logic resides on the Web Server, 61, or Application Server, 73, and is displayed on the wireless client, 41, on demand.

The Wireless Thin Client, 41, uses the Wireless Application Protocol or WAP to send and receive data to and from a wireless device, 41. The wireless device, 41, has a WAP browser to display the information. Handheld devices as well as mobile phones may have a WAP browser.

The system and method of our invention imparts interoperability, scalability, and extensibility by creating and using applets, views, and templates in page delivery and markup languages used by browsers, 41, as well as a web engine, 71, that matches views, applets, and templates to browsers, 41. For example, the exemplification described herein with respect to Wireless leverages the extensibility of the web-based architecture by using WAP-compatible "one applet" views, a series of WML templates, 75, in a repository 77, and a web engine, 71, that dynamically generates and renders data on a WAP browser.

More particularly, the web engine, 71, described herein has a plurality of one applet, one-column views for delivering pages to WAP-compliant browsers and other Wireless, WAP-compliant applications.

The WAP-compliant embodiment used to illustrate one embodiment of our invention enables users to access enterprise and portal applications through wireless communication, mobile telephony and Internet. It provides read and write transactions from and to web servers, 61, and application servers, 73, similar to other thin client applications. The WAP- and WML-compliant application will also provide alert capability through a push mechanism.

The WAP-compliant embodiment uses standard WAP (Wireless Application Protocol) and WML (Wireless Markup Language) protocols and relies on mobile phone clients equipped with WML-compliant micro-browsers to display data. Such mobile phones are widely deployed and are available from a number of cellular manufacturers.

The WML micro-browser, 41, sends an encoded WAP request to a WAP gateway, 51, with a URL of the following form:

HTTP://www.mysite.com/myapp/start.swe?SWEview="myLoginControlV
iew"&SWEapplet="myLoginControlApplet"&SWEcmd=InvokeMethod&
SWEm
ethodName="autologin"&Myargs0="abc"&Myargs1="def"

FIG. 5 illustrates the fields used in parsing, retrieving objects, and execution of objects identified in the message request URL. The WAP gateway, 51, decodes the encoded WAP request and sends it to the web server (61) using HTTP. The HTTP request body contains the decoded WAP data and the HTTP request headers contain information about the user agent (phone ID, subscriber ID, browser version) from which the request was originated.

The web server interprets the URL (including the tagged or suffixed entries "start.swe", and the tagged or prefixed entries, "SWEview=", "SWEapplet=", "SWEcmd=" and "SWEmethodName=") and submits it to an application running in the web engine or web server, such as the Siebel Web Server Extension (SWSE), 63. The Siebel Web Server Extension (SWSE), 63, is an application, utility, .exe, or .dll running inside the web server. In the exemplification described herein the SWSE, 63, is a .dll running inside the web server, 61, to handle requests with the "swe" suffix, although it may handle requests with other suffixes or tags or prefixes. The SWSE, 63, then processes the request and sends the request to the web engine, 67, as the Siebel Web Engine (SWE), 67, running within the Siebel Object Manager (SOM), 73, server.

When the web engine, 71, as the SWE, gets the request, it will get the repository objects, 77, referenced in the URL (SWEview, SWEapplet), shown in FIG. 5, from an associated repository, as the Siebel Object Manager ("SOM"), 73, and then instantiate the objects (if they are not already cached) and execute the specified command (SWEcommand and SWEmethodName), again shown in FIG. 5, on the objects. In a preferred embodiment, multiple templates can be applied to a view, where each view in the repository has a template in each page delivery language.

Referring again to FIG. 5, after the command completion, the web engine, 71, as the SWE, interprets the "*.swe" WML template that contains the special embedded tags, for example, SWE tags (Siebel tags.) These tags instruct the web engine, as the SWE, on what data to get from the associated database, 79, through the Siebel Object Manager ("SOM"), 79. The web engine, 71, for example, the SWE, then generates new WML code segments with the requested data and replaces the tags in the original WML template with the new code. The combined complete WML file (also called "WML deck") is then send back from web engine, through the web server and the WAP gateway, to the WML browser.

Users of an application developed using WML interact with the application through their WML micro-browser. The interface they see is a set of WML decks dynamically generated by, for example, the web engine, from the WML templates created by the application developer.

To develop applications, the application developer needs to first create an application definition that includes the object definitions that the application needs. That is, the application developer creates a repository that contains the objects used by the tags in the application's template. Next, the developer creates a set of WML templates with appropriate SWE tags.

The templates the application developer may create can include:

1. "View Template": used for displaying a View; specifies what Applets should appear in the card.
2. "Applet Template": specifies what Fields to include in the Applet and which methods (such as Login, GotoFirst, and GotoPrevious) to make available to the user.
3. "Navigation Template": contains methods—such as Login, Navigate, EnterQuery, and EnterSort—that link to other decks or Views; does not display Views or Applets.
4. "Entry Template": contains a WML form for entering data, and thus is used as the target template for methods such as EnterQuery, EnterSort, NewRecord, and EditRecord.
5. Read-only form template: contains a read-only (non-editable) form applet.
6. Login/Logout templates.

For Field Services, a dispatcher can issue an alert consisting of a short message and a URL to call back using the push component. The push program will send the alert in a WML to the mobile phone, 41, via the WAP gateway, 51, as shown generally in FIG. 4. Upon receipt of the alert, the mobile user can select the URL in the alert and send a response or status update back to the SWE using the WML communication mechanism described above.

One particularly important advantage of wireless devices, 41, is the capability to receive short messages, exemplified by "push" messages. Short messages like alerts can be sent from a WML service to a WAP gateway, 51, that supports push. Not all WAP gateways implement direct push support. The WML SDK (UP.SDK) provided by Phone.com includes a COM notification library that allows a WML service to send alerts through the Phone.com's UP.Link WAP gateway. To send a notification, the push component implements the following steps:

1. Get the subscriber IDs to whom the notification will be sent. Each user authorized to access a particular WML service must have a subscriber ID. The subscriber ID can be provided by the WAP gateway, 51, as part of the user agent information contained in the HTTP header. The WAP gateway, 51, attaches the HTTP header to the WML request before sending the request to the web server. The web server then uses CGI parsing (or some servlet capability) to make the user agent information available to the web application service. To implement push, the WML service must have users' subscriber IDs stored in the database.
2. Instantiate COM library objects to send the notification. To send non-secure notification, the phone.com Ntfn2Client class is used. Otherwise, the phone.com Ntfn3Sclient class is used. For secure notifications, the certificate has to loaded using phone.com NtfnLoadCertAndKey, and a secure connection has to be open using phone.com NtfnRequireSecureConnection. The phone.com NtfnSetHost sets the notification host by using the host name extracted from the subscriber ID. Alerts can then be sent by invoking methods such as phone.com NtfnPostAlert, phone.com NtfnPostPrefetch.
3. Use the COM objects to check the status of notifications (methods phone.com NtfnGetLastResult, phone.com NtfnGetStatus) or to remove pending notifications (methods phone.com NtfnClearPending, phone.com NtfnDeleteAlert, phone.com NtfnRemoveAlertFromInbox.)

For secure notifications, a certificate from a Certificate Authority has to be obtained and installed first. The phone.com UP.SDK provides a utility program that requests a certificate and allows a certificate file to be created.

Since the subscriber ID is required for using the above notification library, a column is necessary in the database schema in order to store the user subscriber ID.

A more generalized push technology is illustrated in FIG. 4 which shows a push technology augmentation of the system shown in FIG. 3. This system includes a push component having a push program 101 including a message queue, 103, that receives the "alert" from a call center, 105, as a Computer Telephony Integration application.

Push technology enables real time updating of field personnel, including newest contacts, leads, pricing, competitive pricing, order status, delivery status, content delivery, including time-critical and mission critical real time content delivery (as weather, road conditions, travel conditions, stock prices, and the like), banking transactions, arrival of WAP/WML based e-mail, and real time updates to networked personal organizers. Notifications can be delivered by push technology, with subsequent delivery of content, or content can be delivered by push technology.

While the invention has been described with respect to WAP-compatible, WML mobile applications, it is to be understood that the method, system, paradigm, and ideas may readily be extended to providing compatibility between clients and servers in other contexts where scalability, extensibility, and interoperability may be an issue.

We claim:

1. A method in a client-server system in which a server is configured to receive requests from a client and send responses to the client, comprising:
    interpreting the request to determine at least one of a language, protocol, or syntax in which the client sends requests and receives responses;
    interpreting the request to determine data submitted by the client, wherein said data is used to create, modify, delete, or append to objects or user data in the server system; and
    creating a response in said language, protocol, or syntax of the client, wherein said response is representative of the state of an object in the server system following the processing of the request.

2. The method of claim 1, wherein interpreting the request to determine data submitted by the client comprises:
    interpreting the request to determine the classes and instances of said objects and user data to associate with the request; and
    interpreting the request to determine commands to be executed by said objects.

3. The method of claim 1, further comprising:
    embedding information in early responses to the client;
    including said information in subsequent requests from the same client; and
    using said information by the server during the processing of subsequent requests.

4. The method of claim 1, wherein the request includes one or more tokens specifying said language, protocol, or syntax of the client.

5. The method of claim 4, wherein the client request further includes tokens that specify instances of object types specified in the metadata repository to be created, modified, or deleted.

6. The method of claim 5, wherein part of the metadata associated with an object is in the form of one or more template objects, said template objects containing rules for representing the object in various languages, protocols, or syntaxes.

7. The method of claim 1, wherein interpreting the request to determine at least one of a language, protocol, or syntax comprises reading data embedded in header responses.

8. In a client-server system wherein a server is configured to receive requests from a client and send responses to the client, computer executable software code comprising:

code to interpret the request to determine at least one of a language, protocol, or syntax in which the client sends requests and receives responses;

code to interpret the request to determine data submitted by the client, wherein said data is used to create, modify, delete, or append to objects or user data in the server system; and code to create a response in said language, protocol, or syntax of the client, wherein said response is representative of the state of an object in the server system following the processing of the request.

9. The software code of claim 8, further comprising code to recover metadata from a metadata repository associated with the server.

10. The software code of claim 8, wherein said code to interpret the request to determine data submitted by the client comprises:

code to interpret the request to determine the classes and instances of said objects and user data to associate with the request; and code to interpret the request to determine commands to be executed by said objects.

11. The software code of claim 8, further comprising code to recover user data or business data from database servers or application servers associated with the server.

12. The software code of claim 8, further comprising code to embed information in early responses to the client, wherein said information is included in subsequent requests from the same client and wherein said information is used by the server during the processing of subsequent requests.

13. The software code of claim 8, wherein the server response is in the form of an object intended for display in a client with a user interface.

14. The software code of claim 8, wherein said object comprises a page.

15. The software code of claim 13, wherein the client comprises a browser.

16. The software code of claim 8, wherein the request includes one or more tokens specifying said language, protocol, or syntax of the client.

17. The software code of claim 16, wherein at least one of said tokens identify metadata objects that are available to the server system.

18. The software code of claim 17, wherein said metadata objects are selected from the group consisting of views, pages, applets, controls, and objects, said objects having user interface semantics.

19. The software code of claim 17, wherein said metadata objects are selected from the group consisting of business objects, business components, and objects having non-interface semantics.

20. The software code of claim 19, wherein said metadata objects having non-interface semantics are selected from the group consisting of linkages to other objects, containment, and association.

21. The software code of claim 20, wherein said association comprises a user interface representation.

22. The software code of claim 16, wherein the client request further includes tokens that specify instances of object types specified in the metadata repository to be created, modified, or deleted.

23. The software code of claim 17, wherein part of the metadata associated with an object is in the form of one or more template objects, said template objects containing rules for representing the object in various languages, protocols, or syntaxes.

24. The software code of claim 23, wherein said template object is stored as a file in the server file system.

25. The software code of claim 23, wherein said template object as a binary object in a database or other on-line storage system.

26. The software code of claim 23, wherein each template object is associated with a particular language, protocol, or syntax.

27. The software code of claim 23, wherein said code to interpret the request to determine at least one of a language, protocol, or syntax comprises code to use a template object associated with said language, protocol, or syntax, to represent an instance of the parent metadata object to the client.

28. The software code of claim 27, further comprising code to iterate and enumerate child or subordinate objects.

29. The software code of claim 27, wherein at least one of said rules pertains to containment.

30. The software code of claim 27, wherein at least one of said rules comprises a placeholder for specific properties of the metadata object.

31. The software code of claim 27, wherein at least one of said rules includes a specifier of a language or protocol for representation of an instance of the metadata object.

32. The software code of claim 27, wherein at least one of said rules comprises constants or literals to enable the representation of portions of the metadata object without processing by the server system beyond inserting the constants or literals into the body of a response to client requests.

33. The software code of claim 27, wherein at least one of the rules includes multiple variants, each specifying a different language, protocol, or syntax.

34. The software code of claim 33, further comprising code to assign a default value to said language, protocol, or syntax.

35. The software code of claim 8, wherein said code to interpret the request to determine data submitted by the client comprises code to recognize a client preferred markup language is a markup language.

36. The software code of claim 35, wherein the markup language is selected from the group consisting of SGML, HTML, WML, HDML, and XML.

37. The software code of claim 36, wherein the response can be created in multiple markup languages.

38. The software code of claim 37, wherein said code to interpret the request to determine data submitted by the client further comprises code to use similarities among various markup languages, to optimize the creation of the response in the different markup languages.

39. The software code of claim 38, wherein one markup language is derived from another markup language, and wherein said code to interpret the request to determine data submitted by the client further comprises code to use common components or procedures that represent metadata objects in the parent language.

40. The software code of claim 39, wherein said code to interpret the request to determine data submitted by the client further treats two or more markup languages as being derived from an artificially constructed markup language.

41. The software code of claim 40, wherein the derivation structure of the languages includes more than one layer of derivation.

42. The software code of claim 40, wherein an artificial language occupies a position in the derivation structure between one or more known languages.

43. The software code of claim 38, wherein the properties of a metadata object that are identified by placeholders in the templates have different representations in different languages, protocols, or syntaxes, and wherein this object is represented in the language of the client.

44. The software code of claim 43, wherein said code to interpret the request to determine at least one of said language, protocol, or syntax comprises code to identify the client's language, protocol, or syntax, and associate it with the current client request.

45. The software code of claim 44, wherein said code to interpret the request to determine at least one of said language, protocol, or syntax comprises code to query the current context for the preferred language, protocol, or syntax, and use this preference to create the response including representations of objects in the preferred language, protocol, or syntax.

46. The software code of claim 8, wherein said code to interpret the request to determine at least one of said language, protocol, or syntax comprises code to identify the preferred language, protocol, or syntax of the client, receiving data from the client and using the data to add, modify, or delete records in the server database.

47. The software code of claim 46, wherein the preferred language is associated with encoding of the data, and wherein said code to interpret the request to determine at least one of said language, protocol, or syntax further comprises code to remove this language-dependent encoding, and to store the data in a language independent format.

48. The software code of claim 47, wherein the format is persistently associated with the data.

49. The software code of claim 8, wherein tags specifying the language of the request are embedded in the request.

50. The software code of claim 8, wherein the client is an HTML browser and the language corresponding to the client is HTML.

51. The software code of claim 8, wherein the client is a HTTP browser or wireless device and the language corresponding to this client is WML.

52. The software code of claim 8, wherein the language for the client to be used to create the response from the server system is XML.

53. The software code of claim 8, where the language for the client to be used to create the response from the server system is a language which does not include user interface elements.

54. The software code of claim 8, wherein the client comprises a wireless client configured to send requests incorporating tagged requests for pages to the server and receive pages from the server, said tagged requests specifying the language of the request and of the requested response, and wherein said software code further comprises:
   code to parse the tagged request from the client to determine the language of the request and the information requested;
   code to recover information including views from a repository associated with the server; and
   code to render a page to the client including information and views in the language of the request, wherein said view comprises a display and applets in the language requested by the client.

55. The software code of claim 54, wherein said view further comprises data from the server.

56. The software code of claim 8, wherein the client request specifies a directory on the server system, and said directory is associated with the language, protocol, or syntax associated with the client.

57. The software code of claim 8, wherein said code to interpret the request to determine at least one of a language, protocol, or syntax comprises code to read data embedded in header responses.

58. The software code of claim 55, wherein said code to interpret the request to determine at least one of a language, protocol, or syntax further comprises code to embed information included in one or more of URIS, URLs, or URNS in the server responses, and where the client is configured to use the one or more of URIS, URLs, or URNS to submit further requests to the server.

59. The software code of claim 8, wherein said code to interpret the request to determine at least one of a language, protocol, or syntax further comprises code to interpret an early request from a client as a persistent preference for language, protocol, or syntax, and to store this preference and use the stored preference to retrieve the language, protocol, or syntax preference of the client from the dictionary or other cache.

\* \* \* \* \*